United States Patent
Huffman

(12) 
(10) Patent No.: US 6,325,317 B1
(45) Date of Patent: Dec. 4, 2001

(54) DOWNRIGGER ELECTRIC DRIVE ASSEMBLY AND METHOD

(75) Inventor: Carl T. Huffman, Summerfield, NC (US)

(73) Assignee: Electric Fishing Reel Systems, Inc., Greensboro, NC (US)

( * ) Notice: Subject to any disclaimer, the term of this patent is extended or adjusted under 35 U.S.C. 154(b) by 0 days.

(21) Appl. No.: 09/551,885

(22) Filed: Apr. 18, 2000

(51) Int. Cl.[7] .................................................. B65H 75/48
(52) U.S. Cl. ........................ 242/390.8; 43/43.12
(58) Field of Search ........................... 242/396.8, 225, 242/250, 253; 43/43.12

(56) References Cited

U.S. PATENT DOCUMENTS

| | | | |
|---|---|---|---|
| 3,037,317 | * 6/1962 | Morrison | 43/43.12 |
| 3,719,331 | * 3/1973 | Harsch | 242/390.8 |
| 3,785,079 | * 1/1974 | Rohn | 242/390.8 |
| 3,835,571 | * 9/1974 | Berry | 242/250 |
| 3,916,555 | * 11/1975 | Booth et al. | 43/43.12 |
| 3,961,437 | * 6/1976 | Lewis | 43/43.12 |
| 3,979,081 | 9/1976 | Miyamae | 242/84.1 |
| 4,283,025 | 8/1981 | Whisenhunt | 242/84.1 |
| 4,417,414 | * 11/1983 | Hood et al. | 43/43.12 |

OTHER PUBLICATIONS

Elec–Tra–Mate Instruction Manual (undated), 16 pages.
Elec–Tra–Mate Instruction Manual (undated), 24 pages.
Elec–Tra–Mate Owner's Manual, Published May 1995, 23 pages.
Elec–Tra–Mate Instruction Manual, (undated), 20 pages.
Elec–Tra–Mate Electric Fishing Reel Drives brochure, (undated), 6 pages.
Elec–Tra–Mate Electric Fishing Reels Drives for Penn Reels, 1995 Our Silver Anniversary! brochure, (undated), 8 pages.
Outer Banks Outfitters Summer 1999 Monster Catalog, (front and back cover and p. 127).
Whisenhunt Electric Fishing Reels brochure, (undated), 4 pages.
Penn Reels 2000 catalog, ©1999, see pages 60 and 61.
Penn Reels catalog, ©1995, see pp. 36 and 37.

* cited by examiner

*Primary Examiner*—Emmanuel M. Marcelo

(57) ABSTRACT

An electric drive assembly allows a manual downrigger to be easily converted to electric operation. The electric drive assembly includes a pair of braces which are affixed to the downrigger which are in turn connected to a bracket attached to the electric drive. The electric drive can be removed and the crank reattached for reconversion to manual operation in an easy, quick manner.

10 Claims, 8 Drawing Sheets

DOWNRIGGER ELECTRIC DRIVE ASSEMBLY AND METHOD

FIELD OF THE INVENTION

The invention herein pertains to downriggers as are used for trolling for fish and particularly pertains to a method and apparatus for converting a manual downrigger to electric power.

BACKGROUND AND OBJECTIVES OF THE INVENTION

In recent years more and more fisherman have relied on downriggers for trolling at lower depths. Conventional downriggers are sold both as manual and electric types which include a reel of cable and a swiveling boom tip. Such downriggers are mounted on the rear of a boat and by attaching a conventional fishing line from the fisherman's rod and reel to the weighted downrigger cable, the fishing line is thus lowered to a desired depth which may be 30–90 feet below the water's surface. By trolling at such lower depths, large salmon, bluefish and other species are more likely caught. While both manual and electric downriggers have been commercially available for many years, a need has existed for more versatility which will allow a user to convert from manual to electric power and back as needed. Fishermen often purchase a manual downrigger, only a short time later to determine that it would be advantageous to have one which is electrically powered. Others purchase a motorized downrigger only to find that their purposes are best served by one which can be manually operated. Thus, with the problems and disadvantages of prior art downriggers, the present invention was conceived and one of its objectives is to provide a means for converting a conventional manual downrigger to one which is powered by an electric motor.

It is another objective of the present invention to provide apparatus which will allow a typical manual downrigger to be converted to electric power in a quick, simple and reliable fashion.

It is yet another objective of the present invention to provide a method of converting a downrigger to one having an electric drive and to reconvert it to manual operation as needed.

It is still another objective of the present invention to provide an electric drive assembly for a downrigger which includes a drive bracket and a pair of braces for ease in conversion.

It is a further objective of the present invention to provide a reel shaft extension for attachment to the downrigger cable reel and to the transmission of the electric drive.

Various other objectives and advantages of the present invention will become apparent to those skilled in the art as a more detailed description is set forth below.

SUMMARY OF THE INVENTION

The aforesaid and other objectives are realized by providing an electric drive assembly and method which utilizes an electric drive having an electric motor, transmission and shaft extension similar to those utilized on electric fishing reels. The electric drive is affixed to a conventional manual downrigger utilizing a drive bracket and a pair of downrigger braces affixed in opposing relation proximate the downrigger boom. The drive bracket is attached to the downrigger braces with the shaft extension connected to turn the cable reel. An electric switch activates the electric drive whereby power from the transmission rotates the downrigger reel to either wind or unwind the cable as required.

The steps described above in conversion from a manual to an electric powered downrigger can be reversed and by simply removing a few threaded members the electric drive is replaced with the crank. Now the downrigger is once again available for manual operation.

DETAILED DESCRIPTION OF THE PREFERRED EMBODIMENTS AND OPERATION OF THE INVENTION

Figure 1:
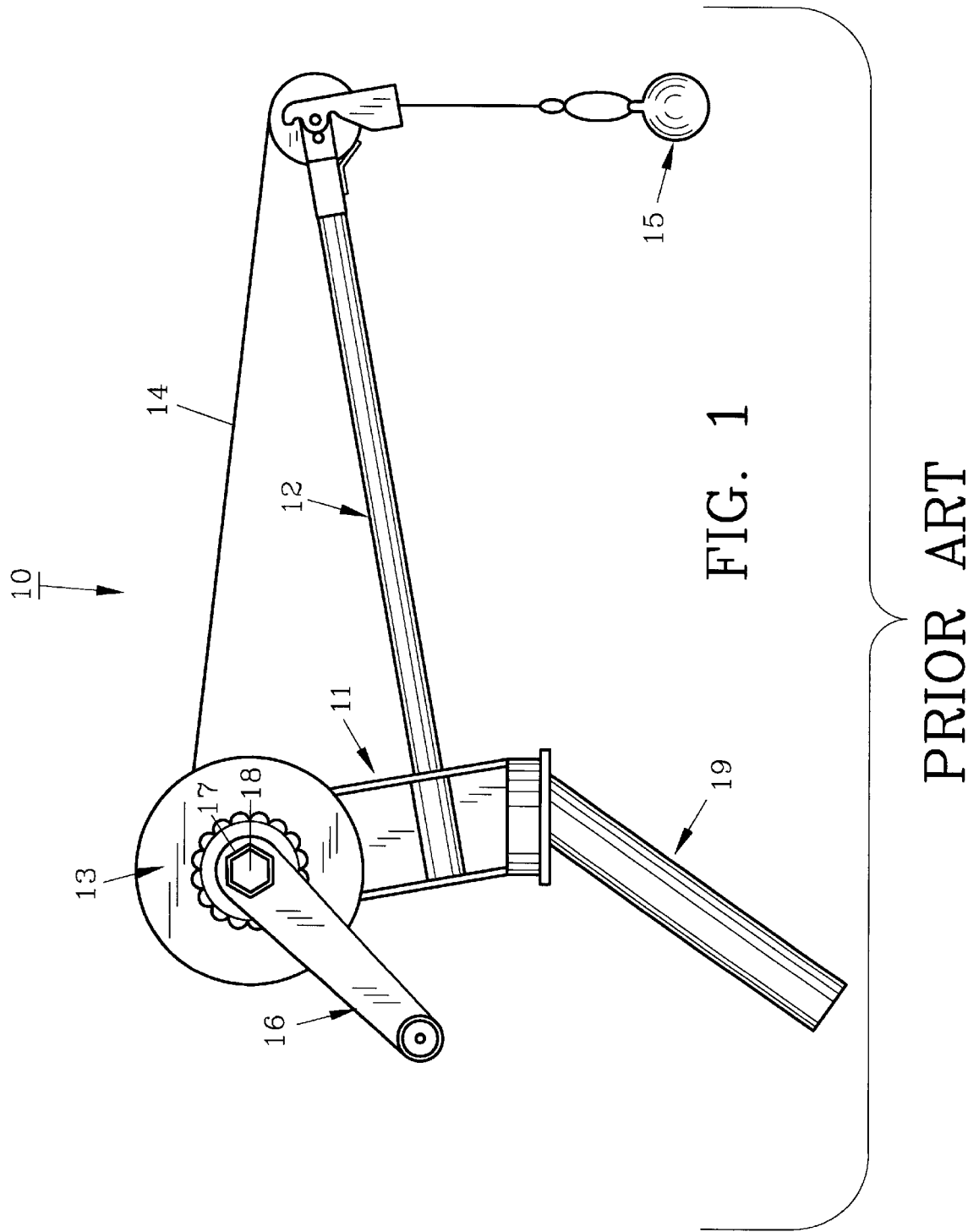
FIG. 1 illustrates a left side view of a typical manual downrigger as removed from its mounting.
Figure 2:
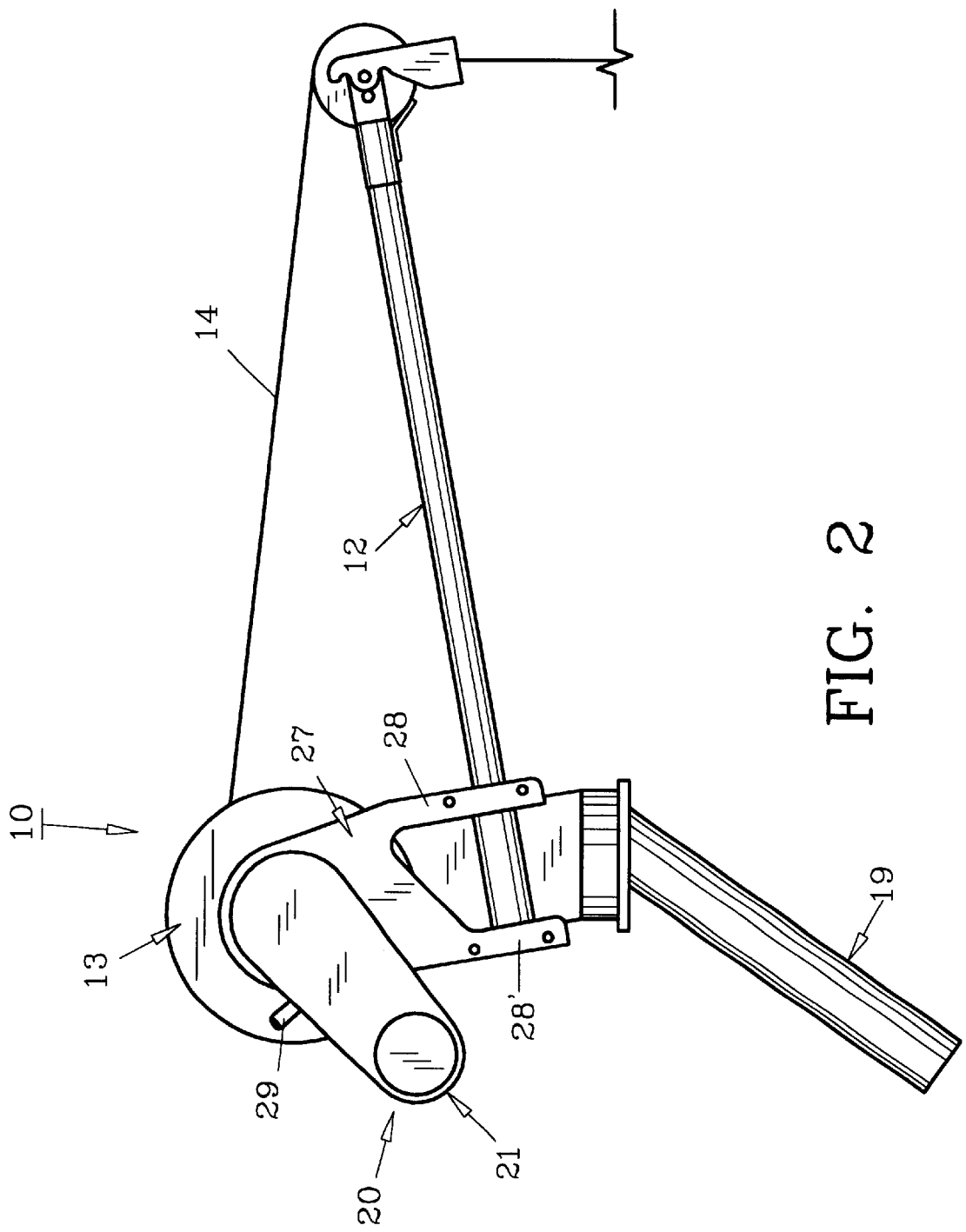
FIG. 2 shows the downrigger of FIG. 1 which has been converted with an electric drive assembly.
Figure 3:
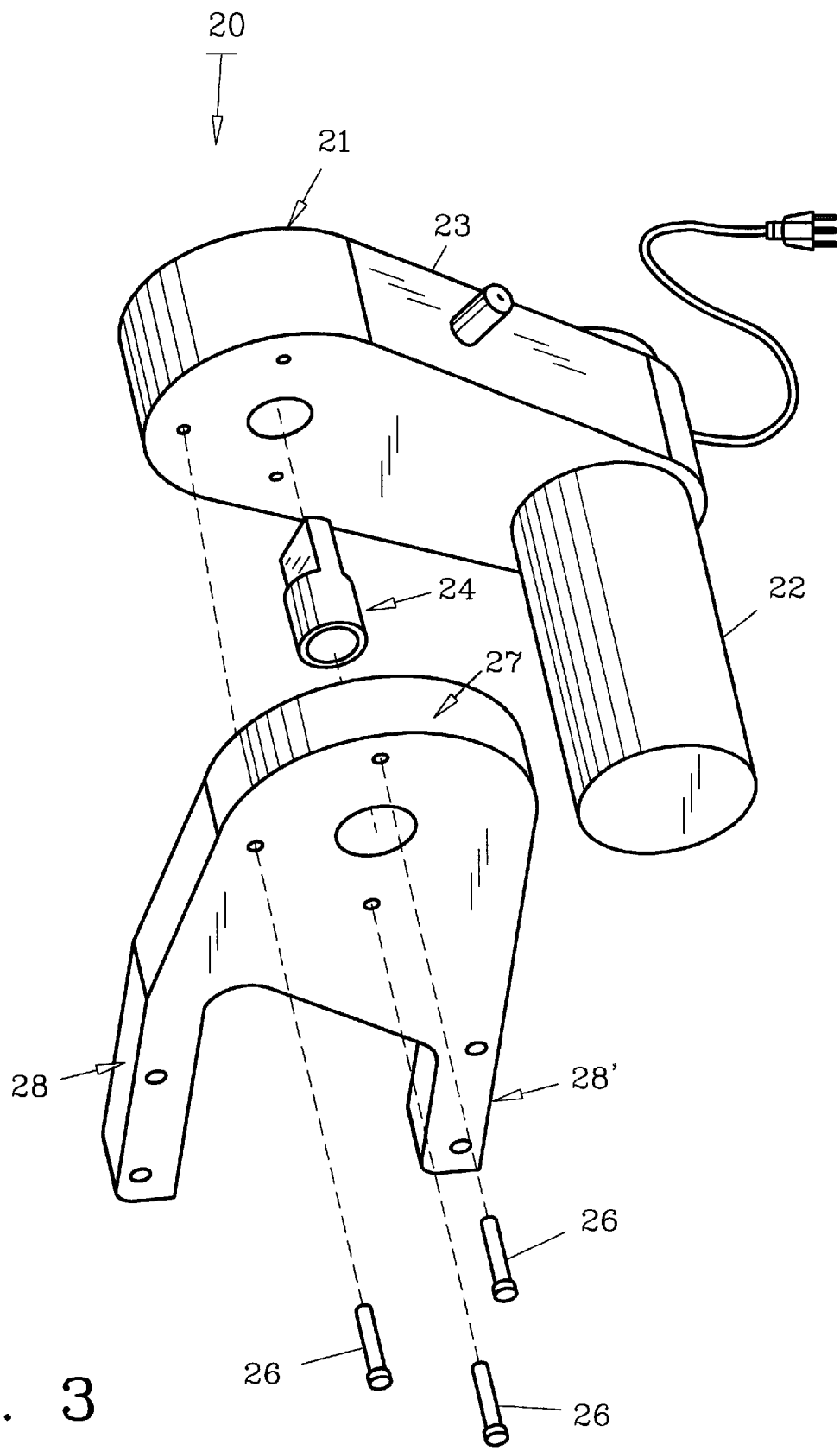
FIG. 3 features an enlarged electric drive assembly of the invention without the downrigger braces.
Figure 4:
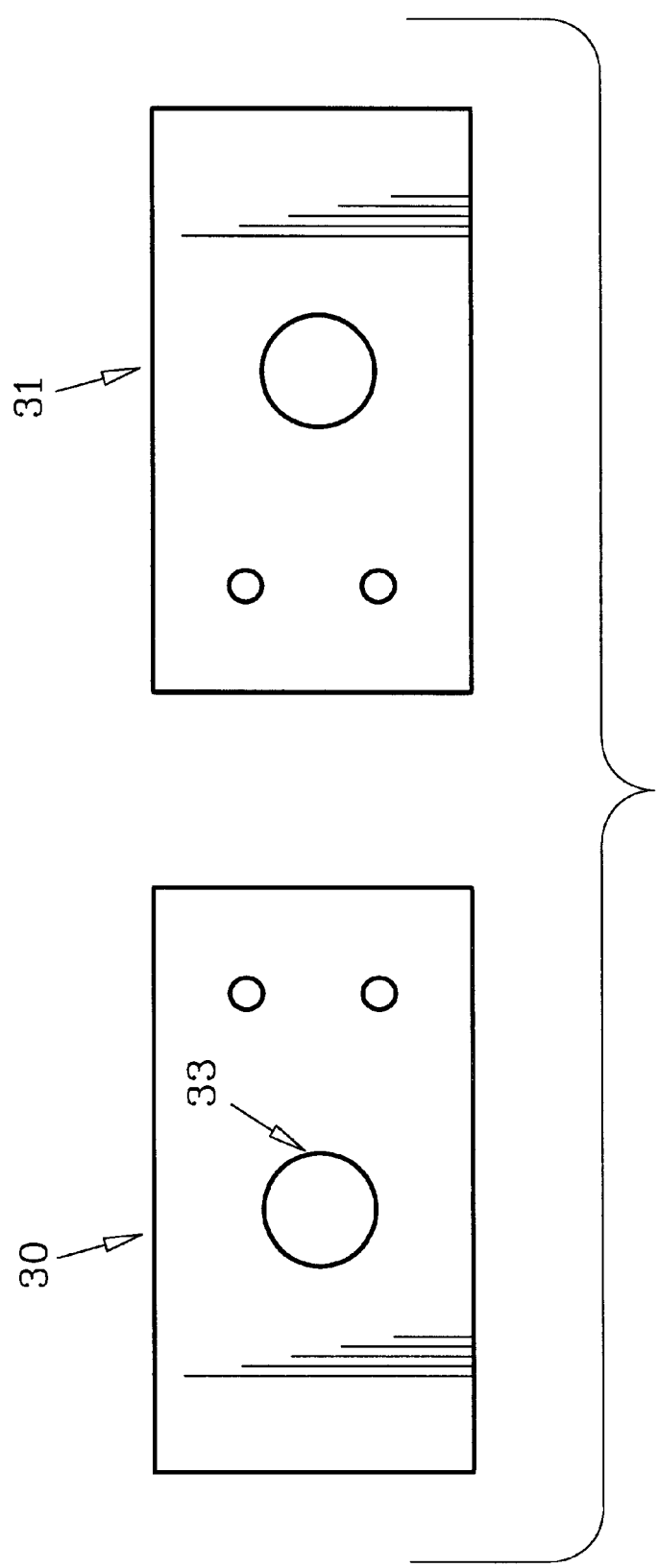
FIG. 4 pictures the first and second downrigger braces which are part of the electric drive assembly.
Figure 5:
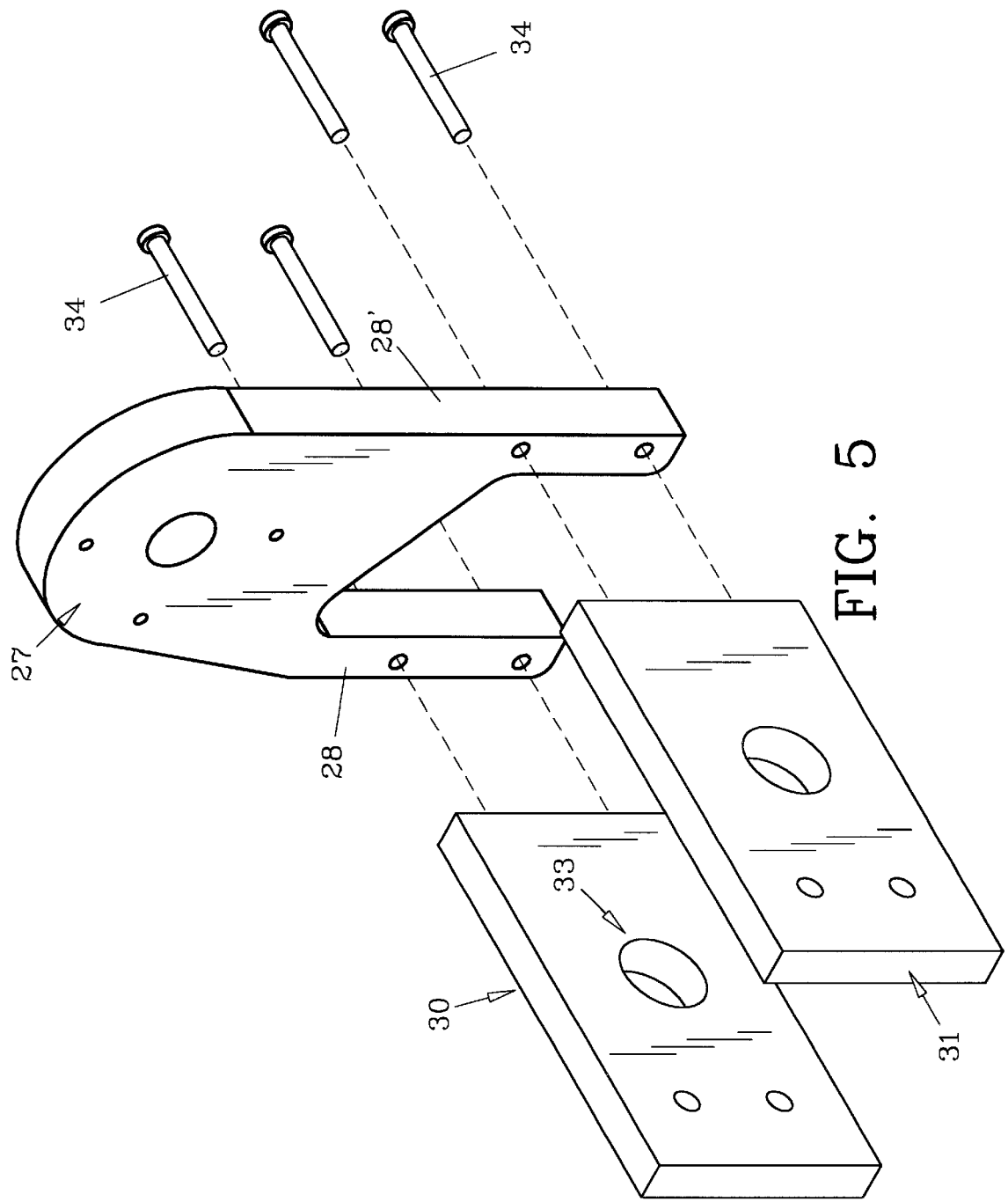
FIG. 5 demonstrates the drive bracket and downrigger braces seen in exploded fashion.
Figure 6:
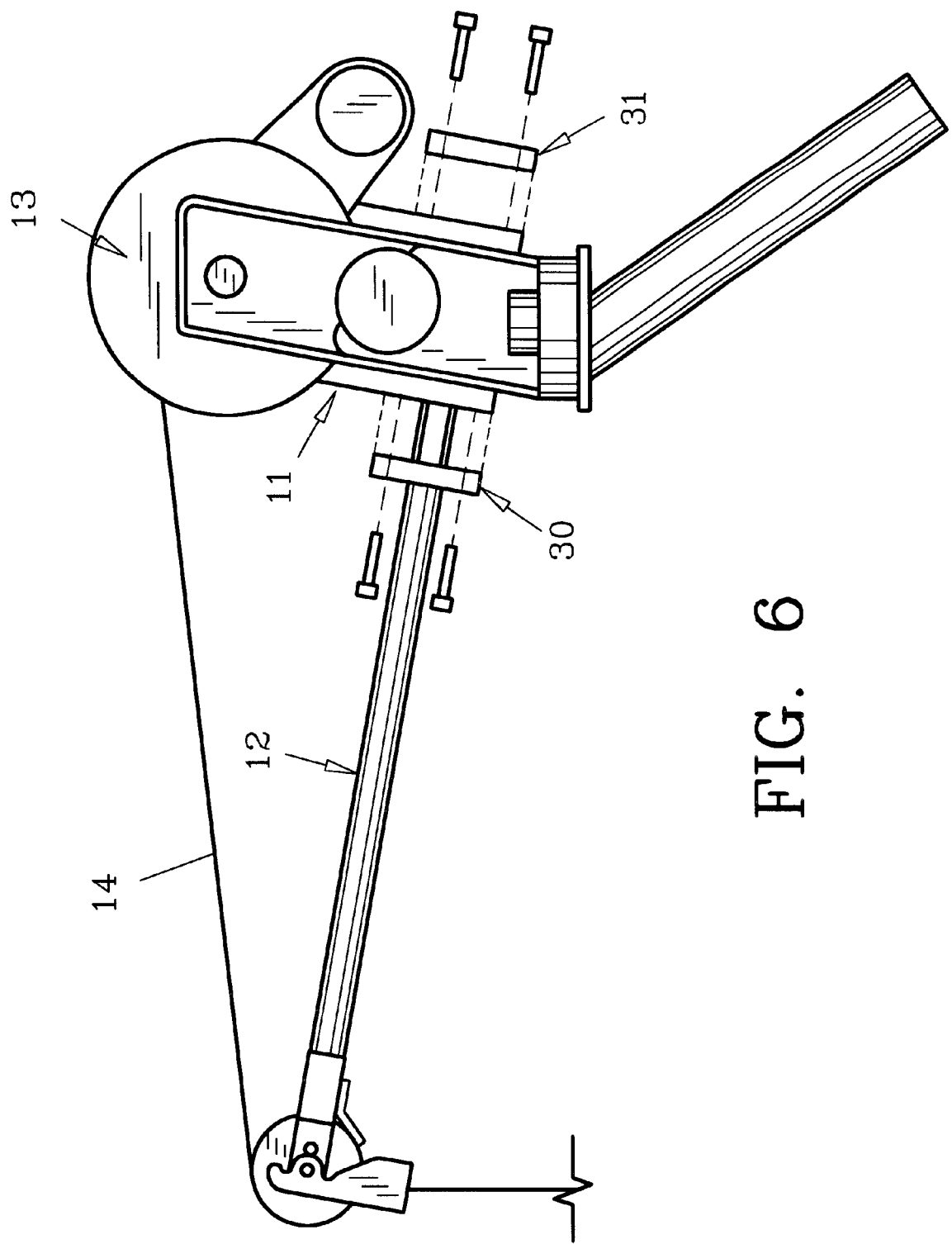
FIG. 6 depicts a right side view of the downrigger with the electric drive assembly having the downrigger braces exploded slightly therefrom.

For a better understanding of the invention and its method of operation, turning now to the drawings, a conventional manually powered downrigger 10 is shown in FIG. 1 having a frame 11, a boom 12 and a cable reel 13. Reel 13 contains wire cable 14 which is affixed to weight 15 at its terminal end for usual connection to a fishing line (not seen). Reel 13 is driven by crank 16 which is fastened by bolt 17 to reel shaft 18. Downrigger 10 is generally affixed to the rear of a boat or otherwise with tubular mount 19. In order to convert downrigger 10 to electric power, electric drive assembly 20 as shown in FIG. 2 is affixed. As will be explained in more detail below, crank 16 (FIG. 1) is removed from reel shaft 18 and is replaced with electric drive 21. As shown in FIG. 3, preferred electric drive assembly 20 includes electric drive 21 having electric DC motor 22, drive transmission 23 and shaft extension 24. Electric drive 21 is joined by threaded members 26 to planar drive bracket 27. Drive bracket 27 is formed from a rigid material such as a suitable plastic or metal and includes a pair of tines 28, 28'. Electric drive 21 is connected to first downrigger brace 30 and second downrigger brace 31 as shown in FIG. 4 and as further illustrated in exploded fashion in FIG. 5. First downrigger brace 3C, and second downrigger brace 31 are shown positioned in opposing fashion proximate boom 12 in FIG. 6 with boom 12 extending through opening 33 (FIG. 5) of downrigger brace 30. First downrigger brace 30 and second downrigger brace 31 as shown in FIG. 6 are threadably attached to opposite sides of downrigger frame 11.

Figure 7:
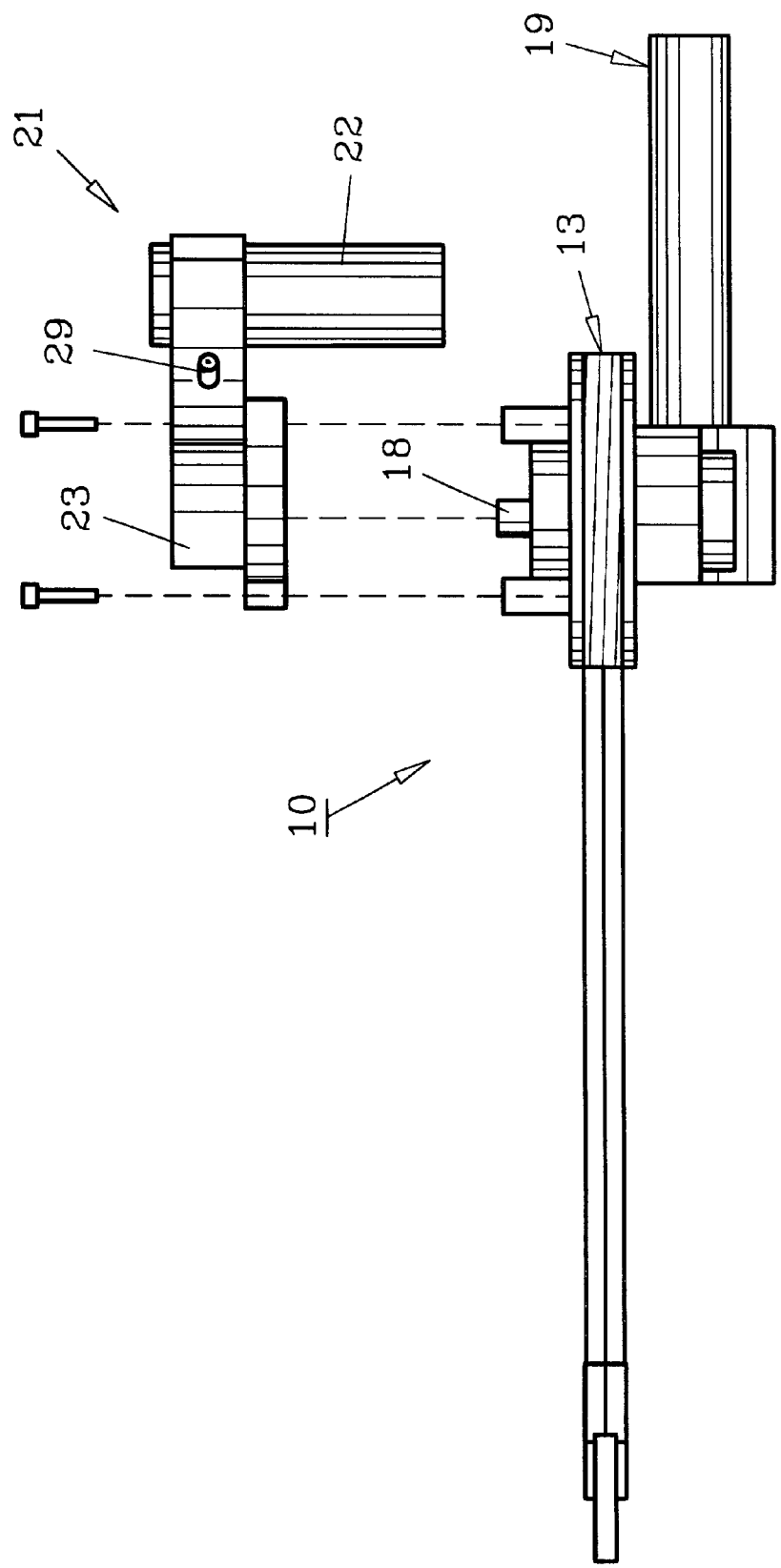
FIG. 7 shows a top view of the electric drive and drive bracket exploded from the downrigger.
Figure 8:
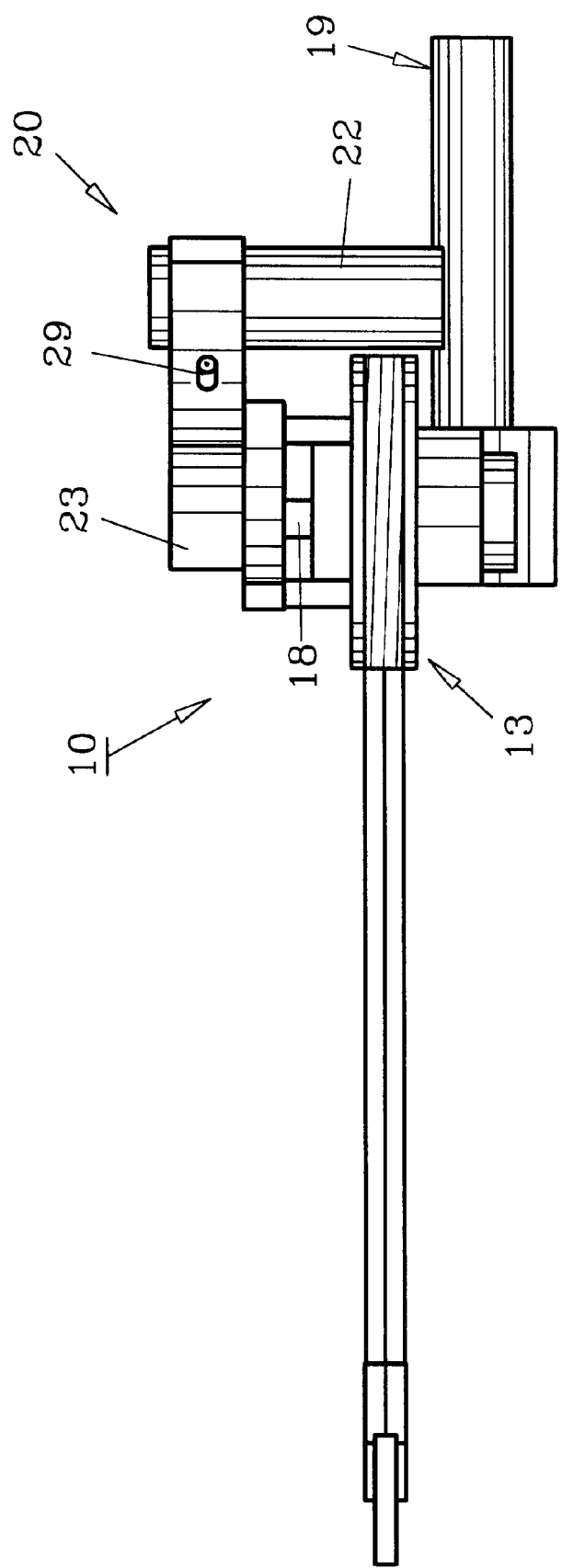
FIG. 8 illustrates the downrigger as shown in FIG. 7 fully assembled.

In FIG. 7 electric drive 21 is shown exploded from downrigger 10 in a top view with reel shaft 18 projecting from reel 13. In FIG. 8 electric drive assembly 20 is attached to downrigger 10 as earlier seen in FIG. 2.

The preferred method of converting manual downrigger 10 (FIG. 1) to electric operation comprises the steps of removing crank 16 from reel shaft 18 by first loosening nut 17 which is affixed thereto. With crank 16 removed, shaft extension 24 is joined to reel shaft 18 which in turn is connected to transmission 23 of electric drive 21 as shown in FIG. 3. Downrigger braces 30, 31 are mounted in opposing relation proximate boom 12 as in FIG. 6. Drive bracket 27 is joined to transmission 23 and thereafter, tines 28, 28' are threadably attached to downrigger braces 30, 31 respectively (FIGS. 5 and 7). Electric switch 29 (FIG. 7) can then be operated after connection to a 12 volt DC power source. A typical manual downrigger such as downrigger 10 in FIG. 1 can be easily converted to electric power by the attachment of drive bracket 27, a pair of planar braces 30, 31 and electric drive 21. The method allows a fisherman to convert a manual downrigger in a quick, easy fashion and to reconvert at will for manual operation.

The illustrations and examples provided herein are for explanatory purposes and are not intended to limit the scope of the appended claims.

I claim:

1. An electric drive assembly for a downrigger having a boom comprising: an electric drive, said drive comprising an electric motor, a drive transmission, said motor connected to said transmission, a drive bracket, said drive bracket connected to said electric drive, a first and a second downrigger brace, said first and second downrigger braces connected to said drive bracket in opposing parallel relation, said first downrigger brace defining a boom opening, said opening to allow the downrigger boom to pass therethrough, and a shaft extension, said shaft extension for joining said electric drive to said downrigger.

2. The electric drive assembly of claim 1 wherein said electric motor is perpendicularly mounted to said transmission, said motor for extending behind said downrigger.

3. The electric drive assembly of claim 1 wherein said shaft extension is joined to said transmission.

4. An electric drive assembly for attachment to a manual downrigger comprising: an electric drive, said electric drive comprising an electric motor, a transmission, said motor perpendicularly connected to said transmission, a shaft extension, said shaft extension connected to said transmission, a drive bracket, said drive bracket joined to said electric drive, said drive bracket defining an aperture, said shaft extension positioned within said aperture, first and second downrigger braces, said braces connected in parallel to said bracket for mounting on said downrigger.

5. The electric drive assembly of claim 4 wherein said motor comprises a 12 volt DC motor.

6. A method of converting a manual crank operated downrigger having a crank handle and a boom to an electric drive comprising the steps of:
   a) removing the crank handle from the downrigger;
   b) affixing a shaft extension to the crank shaft of the downrigger;
   c) coupling said shaft extension to an electric drive; and
   d) attaching a bracket to the electric drive and to the downrigger to secure the electric drive thereto.

7. The method of claim 6 wherein attaching a bracket further comprises the steps of 1) attaching a first brace having an opening and a second brace to the downrigger in parallel opposing relation; 2) attaching the bracket to the first and second braces; and 3) placing the downrigger boom through the opening of said first brace to secure the same.

8. The method of claim 7 wherein attaching a first and second brace comprises attaching first and second planar braces to said downrigger.

9. The method of claim 8 wherein attaching first and second planar braces comprises the step of releasably attaching said first and said second braces to said downrigger with threaded members.

10. The method of claim 6 wherein coupling said shaft extension further comprises the step of coupling to an electric drive having an electric motor perpendicularly mounted to a transmission.

* * * * *